July 6, 1937.  J. P. JOHNSON  2,086,035

COUPLING

Filed June 1, 1936

INVENTOR.
JAMES P. JOHNSON
BY
ATTORNEY.

Patented July 6, 1937

2,086,035

UNITED STATES PATENT OFFICE 2,086,035

COUPLING

James P. Johnson, Shaker Heights, Ohio

Application June 1, 1936, Serial No. 82,761

4 Claims. (Cl. 64—27)

This invention relates to improvements in couplings and has for its primary object to provide a flexible coupling unit adapted to connect a drive member and a driven member in such a manner as to prevent the passage of impulses therebetween which otherwise might cause fatigue and breakage due to crystallization of the respective parts.

A further object of the invention is to provide a flexible coupling for connection between the rotor of a pump and its driving means particularly adapted for use on aircraft although it will be obvious that the coupling may be employed in other connections with as much efficiency and the invention is not therefore to be so restricted.

A still further object of the invention is to provide a flexible coupling unit having simple and expedient means by which the unit may be connected and disconnected.

A still further object of the invention is to provide a flexible coupling unit which is simple in construction, efficient in operation and inexpensive to manufacture.

With the objects above indicated, and other objects hereinafter explained in view, my invention consists in the construction and combination of elements hereinafter described and claimed.

Referring to the drawing.

Figure 1:
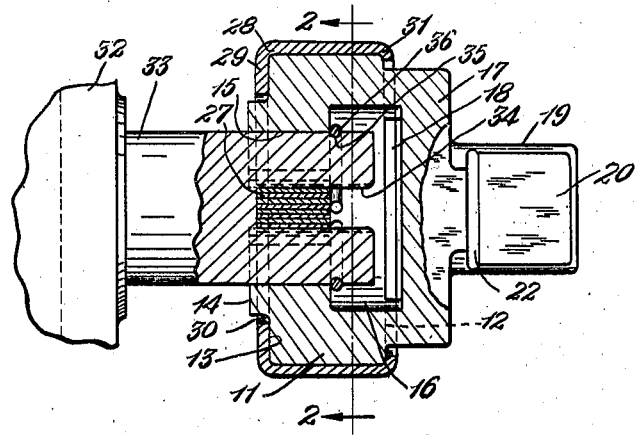
Figure 1 is a longitudinal vertical sectional view of a coupling embodying the present invention, the coupling illustrated being of double size.

In the drawing I have illustrated a coupling embodying the present invention and while the parts are shown in full size and double size by reason that couplings of such size have been successfully used the size naturally will be dependent upon the purpose for which the coupling is intended and the size therefore is not a limiting feature.

The coupling is preferably a self contained unit and comprises a metal casting 10, consisting of a body portion 11 of circular cross section having a wall 12 at one end and a wall 13 at its other end formed with an axial projection 14 of slightly less diameter than the diameter of the body portion 11. The body portion 11 is also provided with an axial opening 15 extending inwardly from the projection 14 and terminates in an axial bore 16 of slightly larger diameter than the diameter of the opening 15, the bore extending through the opposite end wall 12. A channel shaped extension 17 is integrally connected to the body portion 11 adjacent the end wall 12 and bridges the adjacent end of the bore 16 as more clearly shown in Figures 1, 3 and 4. The inner surface of the web of the channel shaped member 17 is spaced from the adjacent surface of the end wall 12 to provide a passageway 18 for a purpose to be later described.

An extension 19 is integrally connected to the channel shaped member 17 and extends axially outwardly thereof providing a suitable means by which connection is afforded with a driving or driven means as the case may be. In the present instance the extension is rectangular in cross section having flat parallel faces 20 on its long sides and arcuate faces 21 on its short sides as more clearly shown in Figure 3. The extension 19 is further provided with breakage grooves 22 on its opposite sides adjacent the channel shaped member 17 and extending transversely of the flat faces 20 as more clearly shown in Figure 4.

The opposite end of the casting 10 is provided with a pair of spaced openings 23 extending inwardly from the projection 14 and disposed adjacent diametrically opposite portion of the outer surface of the body portion 11, the openings 23 terminating at a transverse wall 24 provided in the body portion 11, the surface of said wall 24 being flat. Grooves 25 are provided in the body portion 11 outwardly of the openings 23 but communicating therewith and likewise extend inwardly to the wall 24. The grooves 25 are of slightly less width than the diameter of the openings 23 and where the openings overlap the walls of the projection 14 spaced ends 26 are provided which have slightly rounded edges as more clearly shown in Figure 3.

Figure 2:
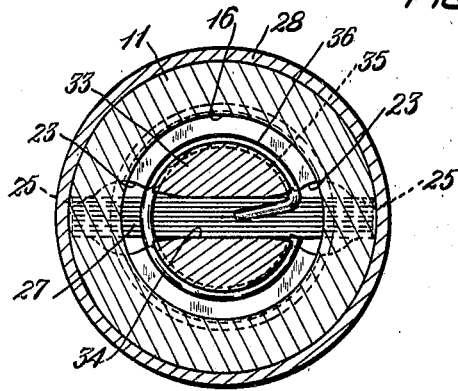
Figure 2 is a transverse sectional view taken on line 2—2 in Figure 1.
Figure 3:
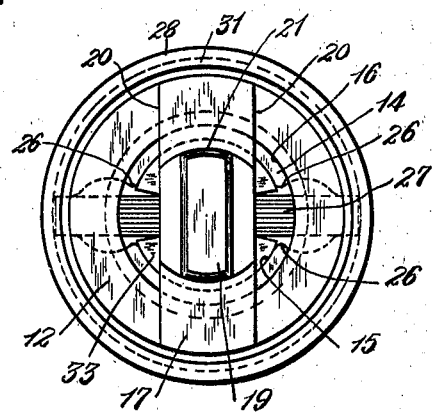
Figure 3 is an end view of the coupling looking from the right of Figure 1.
Figure 4:
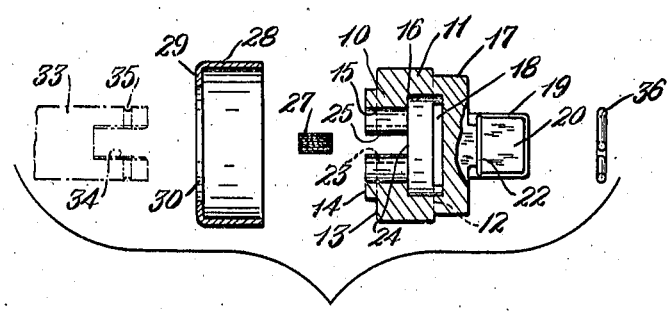
Figure 4 is a longitudinal vertical sectional view with the elements in extended relation in their manner of assembly, the parts illustrated being in full size.

A resilient member 27, in the present instance a plurality of flat sections of spring steel placed freely one over the other, has its free ends disposed within the grooves 25 and its inner side adapted to engage adjacent portion of the wall 24, the resilient member extending transversely across the opening 15 and being slightly spaced from the ends 26 as more clearly shown in Figures 2 and 3.

A metal retainer cap 28 is mounted upon the outer surface of the body portion 11 and has an inwardly extending flange 29 engageable with the end wall 13, which flange terminates in an axial opening 30 to receive the projection 14 and extends over the outer adjacent portion of the resilient member 27, more clearly shown in Figure 1. The opposite end of the cap 28 is spun over at 31 into engagement with the end wall 12 and thus retains the elements in assembled relation. This comprises the unit coupling and it will be obvious that it consists of a minimum of parts easily machined and assembled.

When the coupling is to be used in connection with a rotary pump or the like, the rotor 32, as shown in Figure 1, is provided with an axial extension 33 of a diameter such that it may be easily forced into the opening 15 in the casting 10. The free end of the extension 33 is provided with a transverse slot 34, the adjacent surfaces of which extend angularly from the axis thereof to provide a slight rocking movement between the extension 33 and the resilient member 27 more clearly shown in Figure 2. The extension 33 is definitely positioned within the casting 10 by engagement between the end of the slot 34 and the adjacent edge of the resilient member 27 and when so arranged the free end of the extension 33 projects into the bore 16. An annular groove 35 is provided around the end of the extension 33 and receives a snap ring 36 which detachably secures the extension 33 against accidental displacement. The shape of the ring 36 is more clearly shown in Figure 2 and is insertable through the passageway 18 into the bore 16 where it is readily sprung over the end of the extension 33 and can be moved therealong until it springs into its groove 35. While this construction is simple and expedient it should be understood that other ways of detachably connecting the extension 33 may be adopted and if desired the extension 33 may be secured permanently.

In operation, after the coupling has been installed and the driving means attached to the projection 19, any impulses which may be set up due to rotation of the pump or the parts of the driving means will be absorbed by the flexibility of the resilient spring members 27 due to their flexure within the openings 23.

While I have described the preferred embodiment of the invention it is to be understood that I am not to be limited thereto inasmuch as changes and modifications may be resorted to without departing from the spirit of the invention as defined in the appended claims.

I claim:

1. A coupling comprising a body portion having an axial opening extending inwardly from one end thereof and terminating in an axial bore of larger diameter than the diameter of said opening, said body portion being further provided with transversely aligned grooves on diametrically opposite sides of said opening, a substantially U-shaped extension formed integrally with the other end of said body portion and bridging the adjacent end of said bore, a resilient member having its opposite ends disposed within said grooves and its intermediate portion extending across said axial opening, and a retainer cap extending around said body portion and secured thereto in a manner to prevent accidental displacement of said resilient member.

2. A coupling comprising a body portion having an axial opening extending inwardly from one end thereof and terminating in an axial bore of larger diameter than the diameter of said opening, said body portion being further provided with transversely aligned grooves on diametrically opposite sides of said opening, a substantially U-shaped extension formed integrally with the other end of said body portion and bridging the adjacent end of said bore, an axial projection on the end of said U-shaped extension, a resilient member having its opposite ends disposed within said grooves and its intermediate portion extending across said axial opening, and a retainer cap extending around said body portion and secured thereto in a manner to prevent accidental displacement of said resilient member.

3. A unitary coupling comprising a body portion having an axial opening extending inwardly from one end thereof and terminating in a co-axial bore of relatively larger diameter than the diameter of said opening, said opening and bore being adapted to receive a portion of a drive or driven member, said body portion having a pair of transversely aligned grooves on diametrically opposite sides of said opening, resilient means comprising a plurality of short lengths of flat spring steel arranged in superimposed relation and having their opposite ends disposed within said grooves and their intermediate portions extending across said opening for connection with the drive or driven member whereby a yieldable driving connection is afforded, said body portion having an integral extension bridging the adjacent end of said bore to provide a transverse slot for access to said bore, said extension having an integral axial projection on its outer end adapted for connection with a drive or driven member, and a sleeve encircling said body portion and having an inwardly extending marginal flange at one end engaging the outer face of said body portion for retaining the ends of said resilient means within said grooves and a turned in flange at the opposite end engaging the inner face of said body portion.

4. In a flexible drive, the combination of a drive member and a driven member, one of said members having a transversely extending slot in one end thereof and a circumferential groove adjacent said slot, and a coupling comprising a body portion having an axial opening extending inwardly from one end thereof and terminating in a co-axial bore of relatively larger diameter than the diameter of said opening, said opening and bore being adapted to receive the slotted end portion of one of said members, said body portion having a pair of transversely aligned grooves on diametrically opposite sides of said opening, resilient means comprising a plurality of short lengths of flat spring steel arranged in superimposed relation and having their opposite ends disposed within said grooves and their intermediate portions extending across said opening and disposed within the slotted end of one of the members whereby a yieldable driving connection is afforded, said body portion having an integral extension bridging the adjacent end of said bore to provide a transverse slot for access to said bore, said extension having an integral axial projection on its outer end adapted for connection with the other of said members, a snap ring insertable through said slot into said bore and yieldably disposed in said groove to prevent accidental disengagement between said member and body portion, and a sleeve encircling said body portion and having an inwardly extending marginal flange at one end engaging the outer face of said body portion for retaining the ends of said resilient means within said grooves and a turned in flange at the opposite end engaging the inner face of said body portion.

JAMES P. JOHNSON.